(12) United States Patent
Wang et al.

(10) Patent No.: US 12,475,411 B2
(45) Date of Patent: Nov. 18, 2025

(54) USING COMPUTER MODEL TO DETERMINE AVAILABILITY OF SERVICE OPTION FOR DELIVERY OF ORDER PLACED WITH ONLINE SYSTEM

(71) Applicant: Maplebear Inc., San Francisco, CA (US)

(72) Inventors: Zi Wang, Mountain View, CA (US); Houtao Deng, Sunnyvale, CA (US); Xiangyu Wang, San Jose, CA (US); Ganesh Krishnan, San Francisco, CA (US); Aman Jain, Barrie (CA)

(73) Assignee: Maplebear Inc., San Francisco, CA (US)

( * ) Notice: Subject to any disclaimer, the term of this patent is extended or adjusted under 35 U.S.C. 154(b) by 97 days.

(21) Appl. No.: 18/210,976

(22) Filed: Jun. 16, 2023

(65) Prior Publication Data
US 2024/0420037 A1    Dec. 19, 2024

(51) Int. Cl.
*G06Q 10/04* (2023.01)
*G06Q 10/083* (2024.01)
*G06Q 30/0601* (2023.01)

(52) U.S. Cl.
CPC ........... *G06Q 10/04* (2013.01); *G06Q 10/083* (2013.01); *G06Q 30/0601* (2013.01)

(58) Field of Classification Search
CPC ............................ G06Q 10/04; G06Q 30/0601
See application file for complete search history.

(56) References Cited

U.S. PATENT DOCUMENTS

| | | | |
|---|---|---|---|
| 11,526,831 B1* | 12/2022 | Rafii | G06F 3/0487 |
| 2019/0130350 A1* | 5/2019 | Nguyen | G06Q 10/0834 |
| 2020/0410440 A1* | 12/2020 | Hickey | G06Q 10/0838 |
| 2022/0292407 A1* | 9/2022 | Mahalanobish | G06N 20/20 |
| 2022/0292414 A1* | 9/2022 | Demiralp | G01C 21/3438 |
| 2022/0391832 A1* | 12/2022 | Mohanty | G06N 3/084 |

OTHER PUBLICATIONS

Venki Raman and Sunil Reddy, Predicting Delivery Time of Components in a Supply Chain, Dec. 13, 2017, The IP.com Journal. <https://priorart.ip.com/IPCOM/000252016>. (Year: 2017).*

* cited by examiner

*Primary Examiner* — George Chen
*Assistant Examiner* — Tayar M Kyu
(74) *Attorney, Agent, or Firm* — Fenwick & West LLP

(57) ABSTRACT

Embodiments relate to determining an availability of a service option for delivery of an order placed with an online system. The online system receives an order placed with the online system. The online system accesses a computer model trained to predict a value of metric for an order placed with the online system. The online system applies the computer model to predict the value of the metric for the order. The online system determines which service option of a plurality of service options of the online system is available for delivery of the order, based at least in part on the predicted value of the metric and a threshold. The online system causes the device of the user to display an availability of the determined service option for delivery of the order.

19 Claims, 6 Drawing Sheets

USING COMPUTER MODEL TO DETERMINE AVAILABILITY OF SERVICE OPTION FOR DELIVERY OF ORDER PLACED WITH ONLINE SYSTEM

BACKGROUND

Online systems, such as online concierge systems, offer different delivery service options for their users. In general, online concierge systems provide two distinct sets of delivery service options, i.e., "Estimated Time of Arrival (ETA) availability" delivery service options with a fast delivery experience (e.g., as soon as 15 minutes), and scheduled delivery service options that are scheduled ahead for delivery at a specified future time instant. The ETA delivery service options that provide better delivery times can provide multiple levels of ETA to customers of online concierge systems, such as sETA (i.e., standard ETA delivery service option) and pETA (i.e., priority ETA delivery service option).

However, the delivery service options with better service qualities are typically constrained by available resources of online concierge systems, such as an availability of pickers to fulfill orders within a defined time period. As a supply of pickers decreases over time (e.g., decreases below a defined threshold), the "ETA availability" may be turned off as a delivery service option. Availability of delivery service options plays an important role in customer conversions. For example, customers may not place orders if their preferred delivery service options are not available. In extreme conditions, the customers cannot place orders if neither ETA delivery service options nor scheduled service options are available, which represents a blackout of the online concierge system. Both scenarios result in lost demand from customers and consequently hurt growth of the online concierge system.

From the standpoint of the online concierge system, fulfilling a certain order with different delivery service options means different fulfillment/labor costs, service fees, and fulfillment efficiency. The fulfillment cost and service fee are two of the main contributing factors to a contribution profit (CP). The fulfillment efficiency contributes to the cost as well and plays an important role in fulfillment throughput during supply constraint conditions. From the perspective of pickers, availability of delivery service options does not directly alter their experience. However, the attractiveness of each order is a strong factor in a picker's engagement (i.e., willingness to work) and overall fulfillment throughput. For example, a more attractive order/batch could incentivize pickers from only actively looking to actual engagement. On the contrary, pickers would stay idle longer if the pickers do not find an attractive order/batch. During supply constraint conditions, accepting attractive customer orders with respect to a picker pool can reduce a picker idle time and time to accept (TTA), and better utilize a limited supply of the online concierge system.

The availability of ETA delivery service option and the scheduled delivery service option can be determined at a zone level and zone-warehouse level, respectively. During supply-constrained conditions at the online concierge system, all orders (or visits) of customers within a zone would see no availability for the ETA delivery service option. This is not optimal since a supply of pickers at the online concierge system is not uniformly distributed across retailers within the zone. Also, less busy warehouses would provide no availability for the ETA delivery service option along with more busy warehouses. Thus, turning off the availability of the ETA delivery service option at the zone level means that those retailers that are not as busy would get unnecessarily suboptimal availability of delivery service options. On the other hand, always offering both pETA and sETA delivery service options may not be an optimal strategy for a trade-off between a conversion and CP.

Conventional systems are unable to make individual (i.e., per-order) decisions on delivery service options because there are no adequate mechanisms for treating different shopping carts (i.e., orders) differently. As a result, the conventional systems make macro-level decisions about offering different tiers of delivery service options.

SUMMARY

Embodiments of the present disclosure enable decisions on delivery service options on an order-by-order basis by training a machine-learning computer model to predict a metric (e.g., a time to accept (TTA)) for each individual cart (i.e., order) and then using the predicted metric to make order-based delivery service decisions. This is a technical solution that enables an improved efficiency that was not possible before.

In accordance with one or more aspects of the disclosure, an online concierge system receives, from a user of the online concierge system, a first order placed with the online concierge system. The online concierge system accesses a computer model trained to predict a metric for an order placed with the online concierge system. The online concierge system applies the computer model to predict a first value of the metric for the first order. The online concierge system determines which service option of a plurality of service options of the online concierge system is available for delivery of the first order, based at least in part on the predicted first value of the metric and a first threshold. The online concierge system causes a device of the user to display an availability of the determined service option for delivery of the first order.

DETAILED DESCRIPTION

Figure 1:
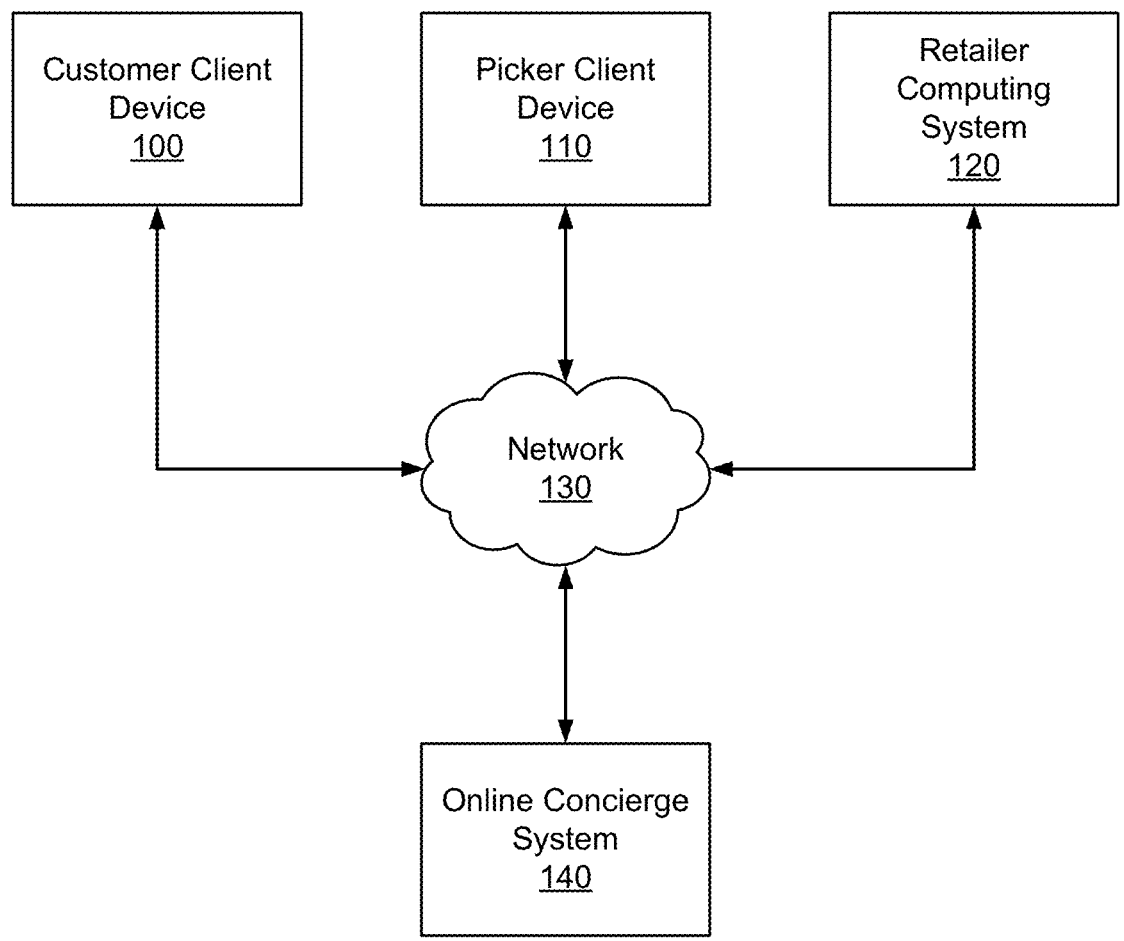
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140.

The online concierge system 140 allows customers of the online concierge system 140 to place orders for fulfillment (delivery) at a future time or during a present time interval. A service option that provides a fulfillment of order at a future time can be referred to as a scheduled delivery service option. A service option that provides a fulfillment of order at a present time interval can be referred to as an immediate delivery service option. An immediate delivery service option is based on an "Estimated Time of Arrival (ETA) availability", and can provide multiple levels of ETA to customers, such as sETA (i.e., standard ETA delivery service option) having a first delivery time and pETA (i.e., priority ETA delivery service option) having a second delivery time that is less than the first delivery time. Both the first and second delivery times are less than a delivery time associated with the scheduled delivery service option.

The online concierge system 140 may not offer the immediate delivery service option if the current orders exceed the supply of pickers at the online concierge system 140 capable of fulfilling the orders. In such cases, the online concierge system 140 may throttle the immediate delivery service option as the supply limit approaches. To improve customer experience and increase supply, as the supply limit of the online concierge system 140 approaches, the online concierge system 140 determines on a per-order (or per-customer) basis whether to provide the immediate delivery service option based on a metric that acts as a proxy for an attractiveness of the order to the pickers. The online concierge system 140 estimates the metric by employing, e.g., a computer model that is trained to predict a time to accept (TTA) an order by a picker once the order is made available to the pickers. Thus, based on the predicted TTA, the online concierge system 140 determines, on a per-order basis, whether or not to provide the immediate delivery service option.

Instead of going from showing availability of the immediate delivery service option for all orders to turning this availability off for all orders, the online concierge system 140 adds an intermediate state that turns on the immediate delivery service option conditionally for some customers and some orders (i.e., batches or carts). Hence, this approach can be also referred to as a "cart level availability" scheme. The online concierge system 140 utilizes a prediction of a metric (e.g., TTA) for each order as a proxy to evaluate an attractiveness of batches/orders, which is then used to decide which orders (i.e., carts) would be offered with the immediate delivery service option. The online concierge system 140 applies a computer model to estimate (or predict) a value of the metric (e.g., TTA) for each order placed with the online concierge system 140.

During supply shortage conditions at the online concierge system 140, the online concierge system 140 may filter out some unattractive orders (e.g., small orders, single batched orders, and/or orders with long delivery distances), and save the limited supply for more attractive orders (e.g., large orders, double batched orders, and/or orders with short delivery distances). This would improve the picker engagement and fulfillment efficiency, translating to an incremental contribution profit (CP) per picker, improved shopper engagement, and improved level of supply of the online concierge system 140. By performing the conditional per-order (or per-customer) basis determination on the immediate delivery service option, the online concierge system 140 tackles a tradeoff between a conversion and CP. Furthermore, the online concierge system 140 transitions from the zone level shutoff to the order level (i.e., cart level) shutoff for the immediate delivery service option, while prioritizing more attractive orders for an improved supply engagement and fulfillment efficiency.

By employing the "cart level availability" approach presented herein, the online concierge system 140 moves less attractive orders (carts or batches) to later times when there may be more pickers, while increasing the supply of pickers during the current time of high demand for more attractive orders. Furthermore, by employing the "cart level availability" approach, the online concierge system 140 monitors a health state of marketplace in real-time and utilizes cart level information (e.g., number of items in a cart, a gross merchandise value (GMV) of the cart, information about a retailer associated with items in the cart, etc.) to determine which service option is available for a customer's order (visit). More details about this approach are described in relation to FIGS. 2 through 6.

Figure 2:
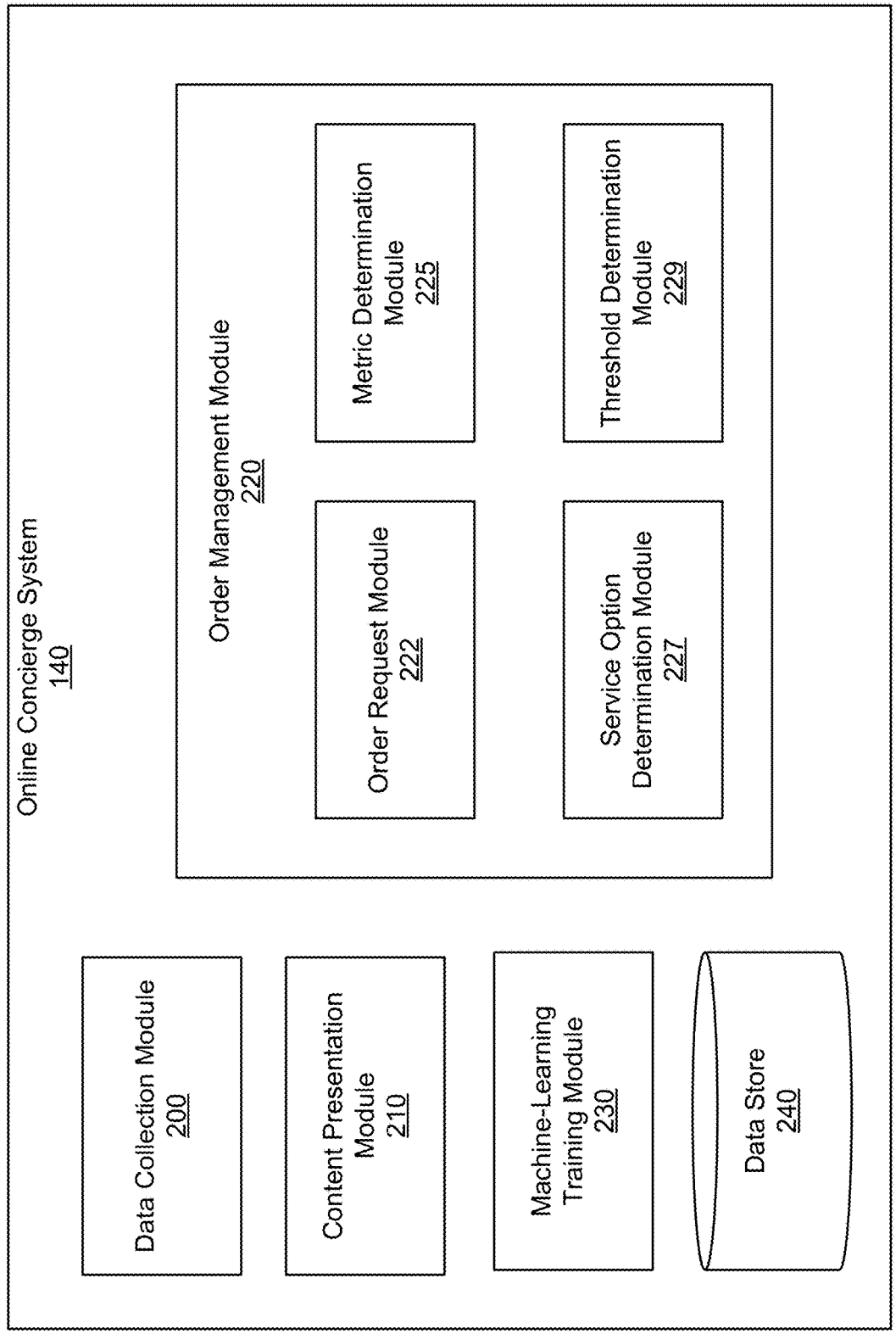
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, and a data store 240. The order management module 220 includes an order request module 222, a metric determination module 225, a service option decision module 227, and a threshold determination module 229. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The order request module 222 of the order management module 220 receives an order placed with the online concierge system 140 by a customer of the online concierge system 140. The order placed with the online concierge system 140 includes information about a shopping cart with a list of items intended to be purchased by the customer. The order placed with the online concierge system 140 may further include a request from the customer for an immediate delivery service option. The order request module 222 may pass the information about the order to the metric determination module 225. The order request module 222 may also make the order visible to a plurality of pickers associated with the online concierge system 140.

The metric determination module 225 of the order management module 220 determines a value of a metric for each order of a plurality of orders placed with the online concierge system 140. The plurality of orders may be received from a plurality of customers of the online concierge system 140. Alternatively, the plurality of orders may be received from a single customer of the online concierge system 140. The metric determination module 225 determines the value of the metric based on an amount of time required for a picker of the plurality of pickers to accept the order received via the order request module 222 once the order is made available to the plurality of pickers. Hence, the metric may correspond to a TTA, and the value of the metric may be a value of the TTA for the order.

The metric determination module 225 may apply a computer model trained to predict a value of the metric (e.g., TTA value) for each order placed with the online concierge system 140. The computer model deployed by the metric determination module 225 may run a machine-learning algorithm to predict a value of the metric for each order. Before deploying the computer model, the metric determination module 225 may provide a set of inputs to the computer model that are associated with a particular order, which may be obtained from the order request module 222. The set of inputs associated with the particular order may include information about cart features associated with the order (e.g., number of items in a cart, GMV of the cart, etc.), information about a retailer associated with the order, contextual features of the order, or some other information that can be used by the computer model to predict a value of the metric (e.g., TTA value) for the order. By predicting the value of the metric, the computer model estimates a level of attractiveness of the order for pickers of the online concierge system 140. Once the computer model is deployed for a particular order of the online concierge system 140, the computer model outputs a predicted value of the metric (e.g., TTA value) for the particular order. The value of the metric (e.g., TTA value) predicted by the computer model for a same order placed with the online concierge system 140 may change according to supply conditions at the online concierge system 140. For example, for the same order, the value of the metric may be higher during weekends and lower on weekdays, as a level of available supply at the online concierge system 140 is typically higher on weekdays than on weekends. A set of parameters for the trained computer model may be stored on one or more non-transitory computer-readable media of the metric determination module 225. Alternatively, the set of parameters for the trained computer model may be stored on one or more non-transitory computer-readable media of the data store 240.

The service option determination module 227 of the order management module 220 determines which service delivery option from a set of service delivery options of the online concierge system 140 is available for the particular order, based on the value of the metric (e.g., TTA value) predicted by the computer model deployed by the metric determination module 225. The service option determination module 227 may determine that at least one of the immediate delivery service options (e.g., sETA delivery service option and/or pETA delivery service option) is available when the value of the metric is less than a threshold (e.g., when the predicted TTA value for the order is low). In such a case, the service option decision module 227 determines that the order is more attractive to pickers and dedicates the at least one immediate delivery service option to this "more attractive" order. Otherwise, the service option determination module 227 may determine that only a scheduled delivery service option from the set of service delivery options is available for the particular order, when the metric is higher than the threshold (e.g., when the TTA value predicted for the particular order is high). In such case, the service option determination module 227 turns off the availability of the immediate delivery service option for this particular order (e.g., sETA and pETA delivery service options are turned off for the order) as the service option determination module 227 determines that the order is less attractive.

The threshold determination module 229 may determine at least one value for at least on threshold that is utilized by the service option determination module 227 for determining which service option is available. The threshold determination module 229 may determine the at least one threshold value based at least in part on information about availability of pickers at a zone level, information about an allowed percentage of late deliveries, an estimated level of late deliveries at a current time, etc. The threshold determination module 229 may dynamically adjust the at least one threshold value utilized by the service option determination module 227.

The content presentation module 210 causes the customer client device 100 to display an availability of a particular service option determined by the service option determination module 227. The content presentation module 210 causes the customer client device 100 to display an availability of the scheduled delivery service option having a first delivery time associated with the order, when a predicted value of the metric (e.g., as predicted by the computer model deployed by the metric determination module 225) is greater than a threshold (e.g., determined by the threshold determination module 229). The content presentation module 210 causes the customer client device 100 to display an availability of the immediate delivery service option (e.g., sETA delivery service options or pETA delivery service option) having a second delivery time associated with the order that is less than the first delivery time, when the predicted value of the metric is less than or equal to the threshold.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The machine-learning training module 230 trains the computer model that is deployed by the metric determination module 225 to predict a metric for an order placed with the online concierge system 140. The machine-learning training module 230 may train the computer model based on availability of plentiful and high quality training order data. The training order data may include information about known TTA values for a set of orders (carts or batches) placed with the online concierge system 140 by one or more customers (e.g., available at the data store 240), information about a marketplace associated with the set of orders, information about available pickers associated with the set of orders, etc.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3:
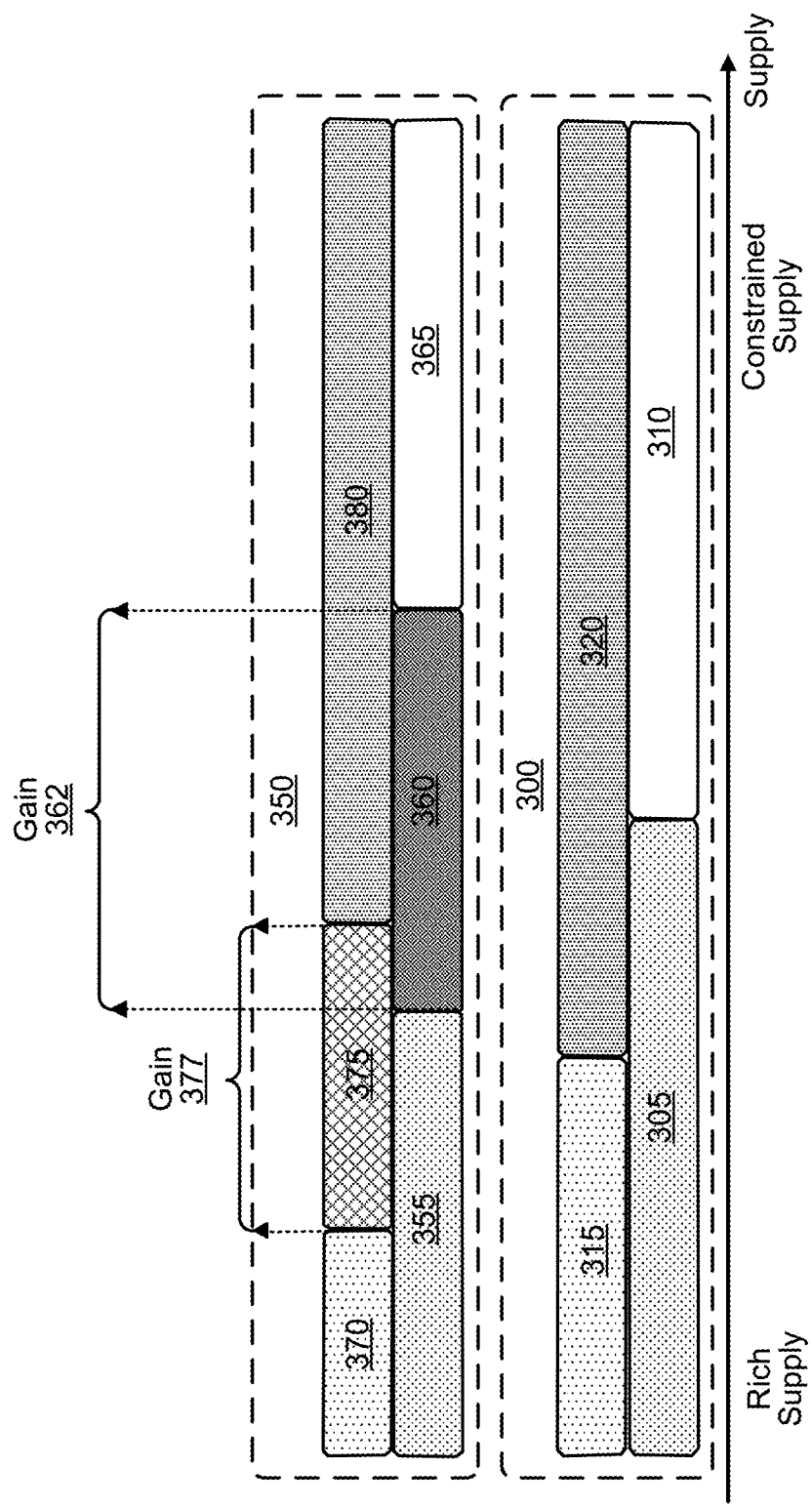
FIG. 3 illustrates an example diagram of an availability of a service option for delivery of orders placed with an online concierge system, in accordance with one or more embodiments.

FIG. 3 illustrates an example diagram of an availability of a service option for delivery of orders placed with the online concierge system 140, in accordance with one or more embodiments. In general, an availability of a service option is a function of a supply at the online concierge system 140 that changes over time from a "rich supply" to a "constrained supply". In a system scheme 300, the online concierge system 140 switches (e.g., via the service option determination module 227) from a delivery mode 305 where the sETA delivery service option is available for all orders placed with the online concierge system 140 to a delivery mode 310 where the sETA delivery service option is turned off for all orders, based on a first threshold that corresponds to a first level of supply available at the online concierge system 140 (e.g., as determined by the service option determination module 227). Additionally, in the system scheme 300, the online concierge system 140 switches (e.g., via the service option determination module 227) from a delivery mode 315 where the pETA delivery service option is available for all orders placed with the online concierge system 140 to a delivery mode 320 where the pETA delivery service option is turned off for all orders, based on a second threshold that corresponds to a second level of supply available at the online concierge system 140 (e.g., as determined by the service option determination module 227). Note that the first threshold and the first level of supply may be higher than the second threshold and the second level of supply.

In a system scheme 350, the online concierge system 140 first operates in a delivery mode 355 (e.g., as determined by the service option determination module 227) where the sETA delivery service option is available for all orders placed with the online concierge system 140 due to a reach supply condition. After that, due to a supply constraint, the online concierge system 140 switches (e.g., via the service option determination module 227) from the delivery mode 355 to an intermediate delivery mode 360 where the sETA delivery service option is conditionally available on a per-order basis, based on a value of a metric (e.g., TTA value) for each order as determined by the metric determination module 225. Only after the intermediate delivery mode 360, the online concierge system 140 (e.g., via the service option determination module 227) switches to a delivery mode 365 where the sETA service delivery option is turned off for all orders due to a significant supply shortage at the online concierge system 140. By introducing the intermediate delivery mode 360, a conversion and CP gain 362 from the conditionally available sETA delivery service option can be achieved.

Furthermore, in the system scheme 350, the online concierge system 140 first operates in a delivery mode 370 (e.g., as determined by the service option determination module 227) where the pETA delivery service option is available for all orders placed with the online concierge system 140 due to a reach supply condition. After that, due to a supply constraint, the online concierge system 140 switches (e.g., via the service option determination module 227) from the delivery mode 370 to an intermediate delivery mode 375 where the pETA delivery service option is conditionally available on a per-order basis, based on a value of a metric (e.g., TTA value) for each order as determined by the metric determination module 225. Only after the intermediate delivery mode 375, the online concierge system 140 switches (e.g., via the service option determination module 227) to a delivery mode 380 where the pETA delivery service option is turned off for all orders due to a significant supply shortage at the online concierge system 140. By introducing the intermediate delivery mode 375, a conversion and CP gain 362 from the conditionally available pETA delivery service option can be achieved.

In the system scheme 350, the online concierge system 140 activates (e.g., via the service option determination module 227) the intermediate delivery mode 360 where the sETA delivery service option is conditionally available on per-order basis earlier than the delivery mode 310 is activated in the system scheme 300 where the sETA delivery service option is turned off for all orders. The earlier activation of the intermediate delivery mode 360 relative to the activation of the delivery mode 310 helps avoid depletion of a supply of pickers. Otherwise, a predicted percentage of late deliveries would exceed an allowable threshold. Note also that the online concierge system 140 activates (e.g., via the service option determination module 227) the intermediate delivery mode 375 where the pETA delivery service option is conditionally available on per-order basis earlier than the online concierge system 140 activates (e.g., via the service option determination module 227) the intermediate delivery mode 360 where the sETA delivery service option is conditionally available on per-order basis. Similarly, the online concierge system 140 activates (e.g., via the service option determination module 227) the delivery mode 380 where the pETA delivery service option is turned off for all orders earlier than the online concierge system 140 activates (e.g., via the service option determination module 227) the delivery mode 365 where the sETA delivery service option is turned off for all orders.

The attractiveness of an order placed with the online concierge system 140 can be qualified by a corresponding TTA value for the order as more attractive orders are associated with lower values of TTA and vice versa for less attractive orders. Hence, the system scheme 350 represents an order attractiveness based scheme that, during the intermediate delivery modes 360 and 375, prioritizes orders based on their predicted TTA using a heuristics policy to determine an availability of sETA/pETA delivery service options. As the supply conditions at the online concierge system 140 worsen, the online concierge system 140 activates (e.g., via the service option determination module 227) the intermediate delivery mode 360 and/or the intermediate delivery mode 375 to selectively accept customers' orders for: (i) achieving better fulfillment efficiency that leads to fulfillment of more orders and higher GMV with the same supply level; (ii) delaying the full zone shut down that leads to a better availability; (iii) achieving better picker engagement that leads to a higher level of supply; and (iv) achieving an improved level of CP. During supply-rich conditions at the online concierge system 140, it is however not desirable to prioritize orders for maintaining growth and maximum picker utilization. During supply-constrained conditions at the online concierge system 140, the online concierge system 140 prioritizes orders based on their attractiveness to pickers. When the supply at the online concierge system 140 becomes so constrained, the immediate delivery service options (e.g., sETA and pETA delivery service options) would be turned off (e.g., via the service option determination module 227) across the zone to avoid over-commitments.

Figure 4:
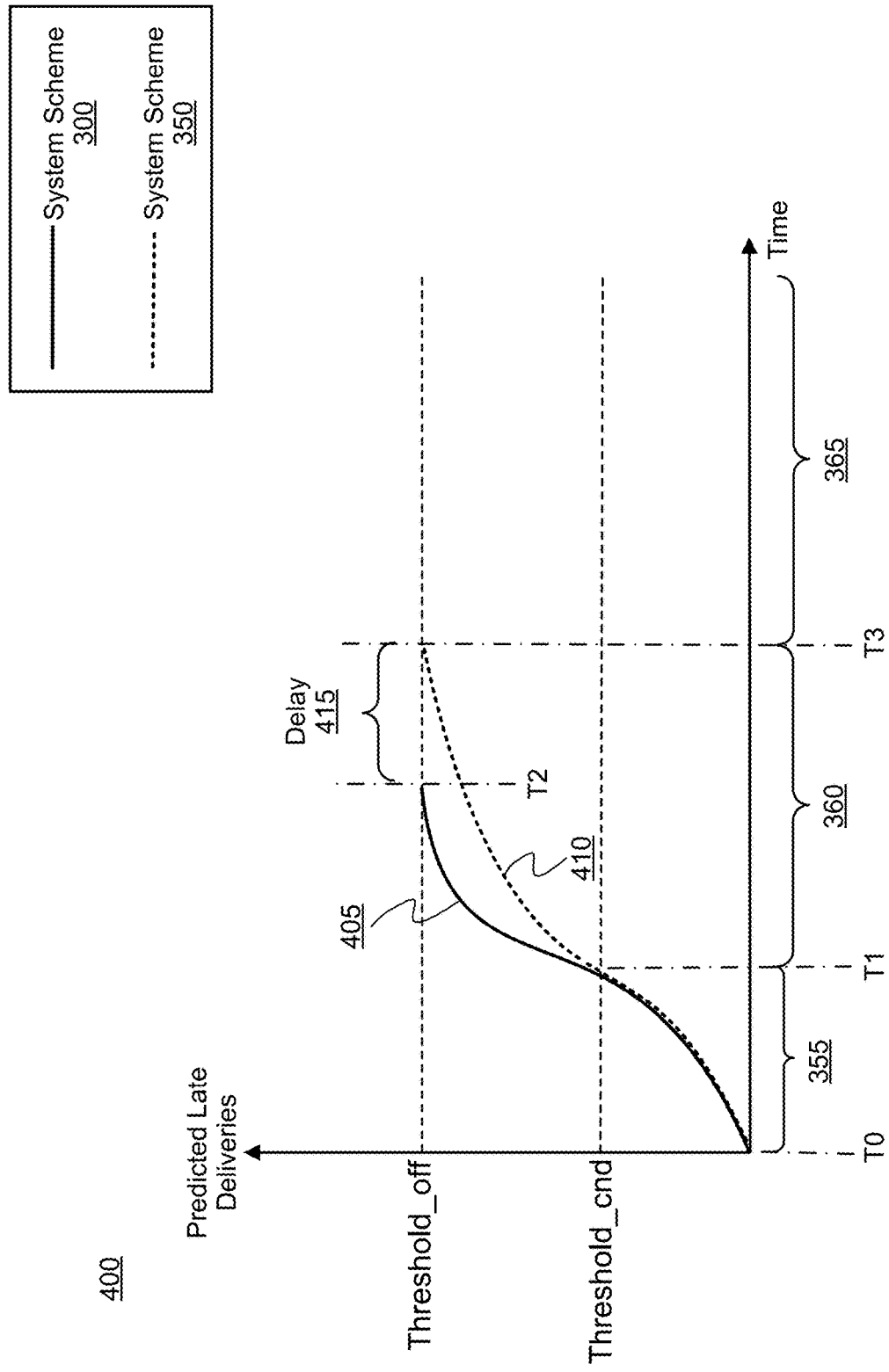
FIG. 4 illustrates an example graph of an availability of different service options for delivery of orders placed with an online concierge system, in accordance with one or more embodiments.

FIG. 4 illustrates an example graph 400 of an availability of different service options for delivery of orders placed with the online concierge system 140, in accordance with one or more embodiments. The graph 400 shows a plot 405 that represents, e.g., a percentage of predicted late deliveries as a function of time for the system scheme 300. The percentage of predicted late deliveries in the graph 400 may represent a metric predicted by the computer model deployed by the metric determination module 225. For the system scheme 300, the online concierge system 140 operates in the delivery mode 305 (or the delivery mode 315) between time instants T0 and T2 where the sETA delivery service option (or the pETA delivery service option) is turned on for all orders (e.g., via the service option determination module 227). At the time instant T2, a level of predicted late deliveries reaches a first defined threshold (e.g., "Threshold_off"), and the online concierge system 140 activates (e.g., via the service option determination module 227) the delivery mode 310 (or the delivery mode 320) where the sETA delivery service option (or the pETA delivery service option) is turned off for all orders.

The graph 400 further shows a plot 410 that represents, e.g., a percentage of predicted late deliveries as a function of time for the system scheme 350. For the system scheme 350, the online concierge system 140 operates in the delivery mode 355 (or the delivery mode 370) between time instants T0 and T1 when the sETA delivery service option (or the pETA delivery service option) is turned on for all orders (e.g., via the service option determination module 227). At the time instant T1, a level of predicted late deliveries reaches a second defined threshold (e.g., "Threshold_cnd"), and the online concierge system 140 activates (e.g., via the service option determination module 227) the intermediate delivery mode 360 (or the intermediate delivery mode 375) where the sETA delivery service option (or the pETA delivery service option) is conditional on per-order (i.e., per-customer) basis. At the time instant T3, a level of predicted late deliveries reaches the first defined threshold (e.g., "Threshold_off"), and the online concierge system 140 activates (e.g., via the service option determination module 227) the delivery mode 365 (or the delivery mode 380) where the sETA delivery service option (or the pETA delivery service option) is turned off for all orders. It can be observed that the system scheme 350 introduces a delay 415 equal to a time period between the time instants T2 and T3 for reaching the first defined threshold and turning off the immediate delivery service option (e.g., sETA or pETA delivery service option) for all orders. Thus, the system scheme 350 effectively introduces a delaying effect of slowing down from progressing into a supply shortage state. This delaying effect of the system scheme 350 combats the availability loss of deliberately turning off the immediate delivery service option for some orders. Note that the first defined threshold (e.g., "Threshold_off") and the second defined threshold (e.g., "Threshold_cnd") may be determined by the threshold determination module 229.

More formally, the system schemes 300 and 350 can be represented by decision policies as provided below. Corresponding values of a metric (e.g., predicted TTAs, predicted percentage of late deliveries, predicted number of late deliveries, etc.) may be predicted by the computer model deployed by the metric determination module 225. For the system scheme 300 and the sETA delivery service option, when a predicted value of the metric is greater than a first threshold, Thr1, then the service option determination module 227 turns off the sETA delivery service option for all orders. Similarly, for the system scheme 300 and the pETA delivery service option, when a predicted value of the metric is greater than a second threshold, Thr2, that is less than the first threshold, then the service option determination module 227 turns off the pETA delivery service option for all orders.

For the system scheme 350 and the sETA delivery service option, when a predicted value of the metric is less than max (Thr2, Thr1−x1), then the service option determination module 227 turns on the sETA delivery service option for all orders. When a predicted value of the metric is greater than Thr1+x2, then the service option determination module 227 turns off the sETA delivery service option for all orders. When a predicted value of the metric is within [max (Thr2, Thr1−x1), Thr1+x2], then the service option determination module 227 activates the conditional per-order sETA delivery service option. For the system scheme 350 and the pETA delivery service option, when a predicted value of the metric is less than Thr2−x1, then the service option determination module 227 turns on the pETA delivery service option for all orders. When a predicted value of the metric is greater than min (Thr2+x2, Thr1), then the service option determination module 227 turns off the pETA delivery service option for all orders. When a predicted value of the metric is within [Thr2−x1, min (Thr2+x2, Thr1)], then the service option determination module 227 activates the conditional per-order pETA delivery service option. Note that x1 and x2 are parameters that can be determined (e.g., via the metric determination module 225) based on an availability of pickers, GMV values of orders, distances associated with pickers, etc. The threshold values Thr2 and Thr2 may be determined by the threshold determination module 229.

Figure 5:
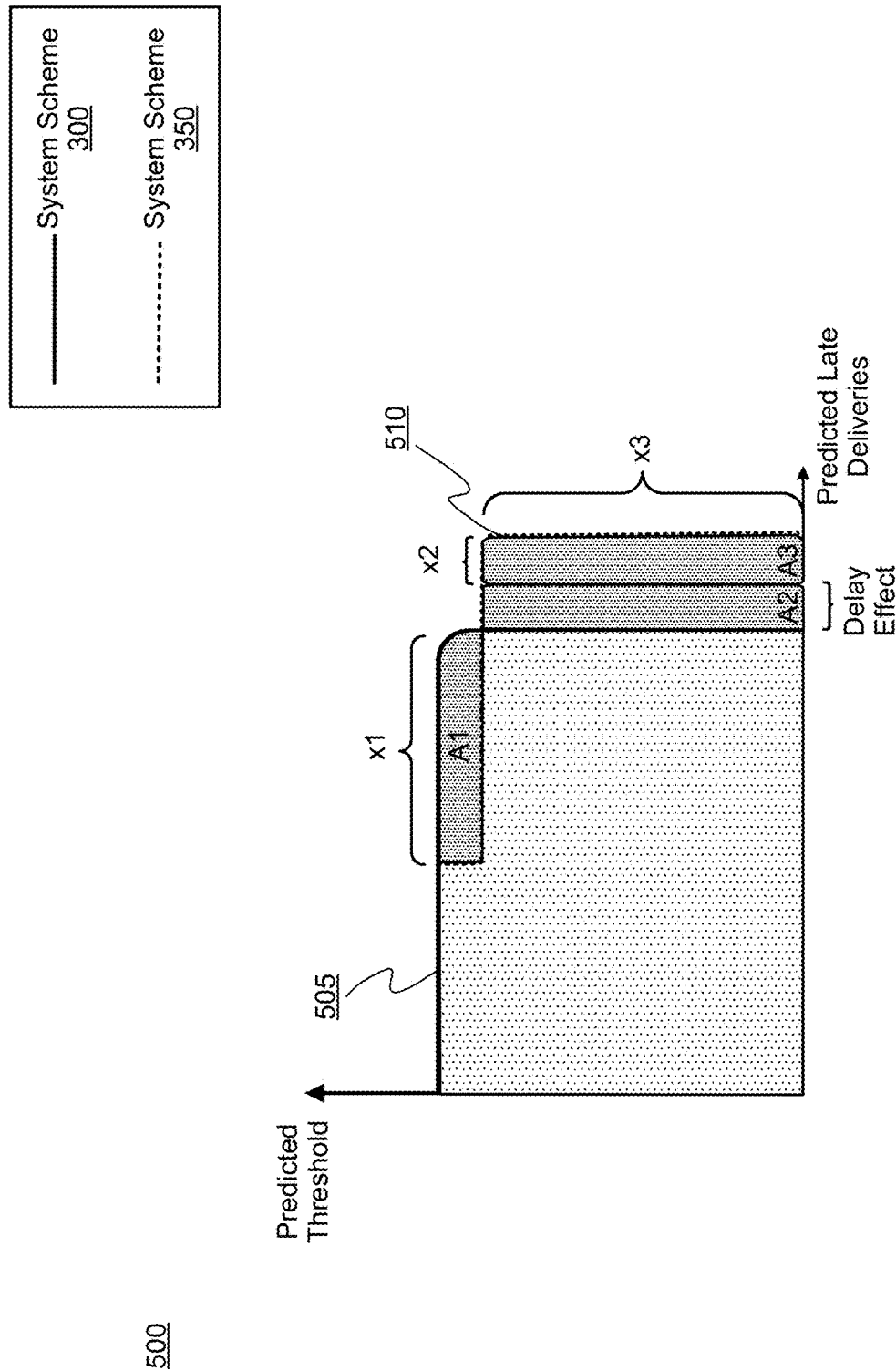
FIG. 5 illustrates an example graph of an availability of immediate delivery service options for orders placed with an online concierge system for different delivery schemes, in accordance with one or more embodiments.

FIG. 5 illustrates an example graph 500 of an availability of immediate delivery service options for orders placed with an online concierge system for different delivery schemes, in accordance with one or more embodiments. An area 505 represents an availability of an immediate delivery service option (e.g., sETA or pETA delivery service option) for the system scheme 300. An area 510 represents an availability of an immediate delivery service option (e.g., sETA or pETA delivery service option) for the system scheme 350. It can be observed that under the system scheme 350, some availability (e.g., designated as an area A1 in FIG. 5) of the immediate delivery service option may be lost due to the conditional per-order availability of the immediate delivery service option the that starts earlier than turning off the immediate delivery service option for all orders in the system scheme 300. The amount of lost availability A1 may be a function of a parameter x1. However, under the system scheme 350, a gain in availability of the immediate delivery service option (e.g., designated as an area A2 in FIG. 5) may be achieved due to the delaying effect of the conditional per-order availability of the immediate delivery service option. Furthermore, under the system scheme 350, an additional gain in availability of the immediate delivery service option (e.g., designated as an area A3 in FIG. 5) may be achieved via extending a threshold for turning off the immediate delivery service option for all orders by a parameter x2.

The main features of the system scheme 350 are: (i) A2+A3≥A1, i.e., achieving equal or better availability of the immediate delivery service option compared to the system scheme 300; and (ii) achieving a better CP than in the system scheme 300. The neutral or better availability of the immediate delivery service option for the system scheme 350 is achieved by the delaying effect and extending threshold for turning off the immediate delivery service option for all orders. Additionally, as a boost cost increases as a function of a predicted value of the metric (e.g., predicted TTA value), the conditional per-order availability of the immediate delivery service option of the system scheme 350 reduces the boost cost and increases the CP.

In view of the parameters x1, x2 and x3 illustrated in FIG. 5, the delivery policy for the system scheme 350 can be provided as follows. For the system scheme 350 and the sETA delivery service option, when a predicted value of the metric (e.g., percentage of predicted late deliveries) is less than max (Thr2, Thr1−x1), then the service option determination module 227 turns on the sETA delivery service option for all orders. When a predicted value of the metric (e.g., percentage of predicted late deliveries) is greater than Thr1+x2, then the service option determination module 227 turns off the sETA delivery service option for all orders. When a predicted value of the metric (e.g., predicted order-level TTA) for an order placed with the online concierge system 140 is greater than a defined value of parameter x3, then the service option determination module 227 turns off the sETA delivery service option for the placed order. Otherwise, when the predicted value of the metric (e.g., predicted order-level TTA) for the placed order is less than or equal to the defined value of parameter x3, then the service option determination module 227 turns on the sETA delivery service option for the placed order. Note that the threshold Thr2 is less than the threshold Thr1 (e.g., as determined by the threshold determination module 229).

For the system scheme 350 and the sETA delivery service option, when a predicted value of the metric (e.g., percentage of predicted late deliveries) is less than Thr2−x1, then the service option determination module 227 turns on the pETA delivery service option for all orders. When a predicted value of the metric (e.g., percentage of predicted late deliveries) is greater than min (Thr2+x2, Thr1), then the service option determination module 227 turns off the sETA delivery service option for all orders. When a predicted value of the metric (e.g., predicted order-level TTA) for an order placed with the online concierge system 140 is greater than a defined value of parameter x3, then the service option determination module 227 turns off the pETA delivery service option for the placed order. Otherwise, when the predicted value of the metric (e.g., predicted order-level TTA) for the placed order is less than or equal to the defined value of parameter x3, then the service option determination module 227 turns on the pETA delivery service option for the placed order. Note that the parameters x1, x2 and x3 can be determined (e.g., via the metric determination module 225) based on an availability of pickers, GMV values of orders, distances associated with pickers, etc.

Figure 6:
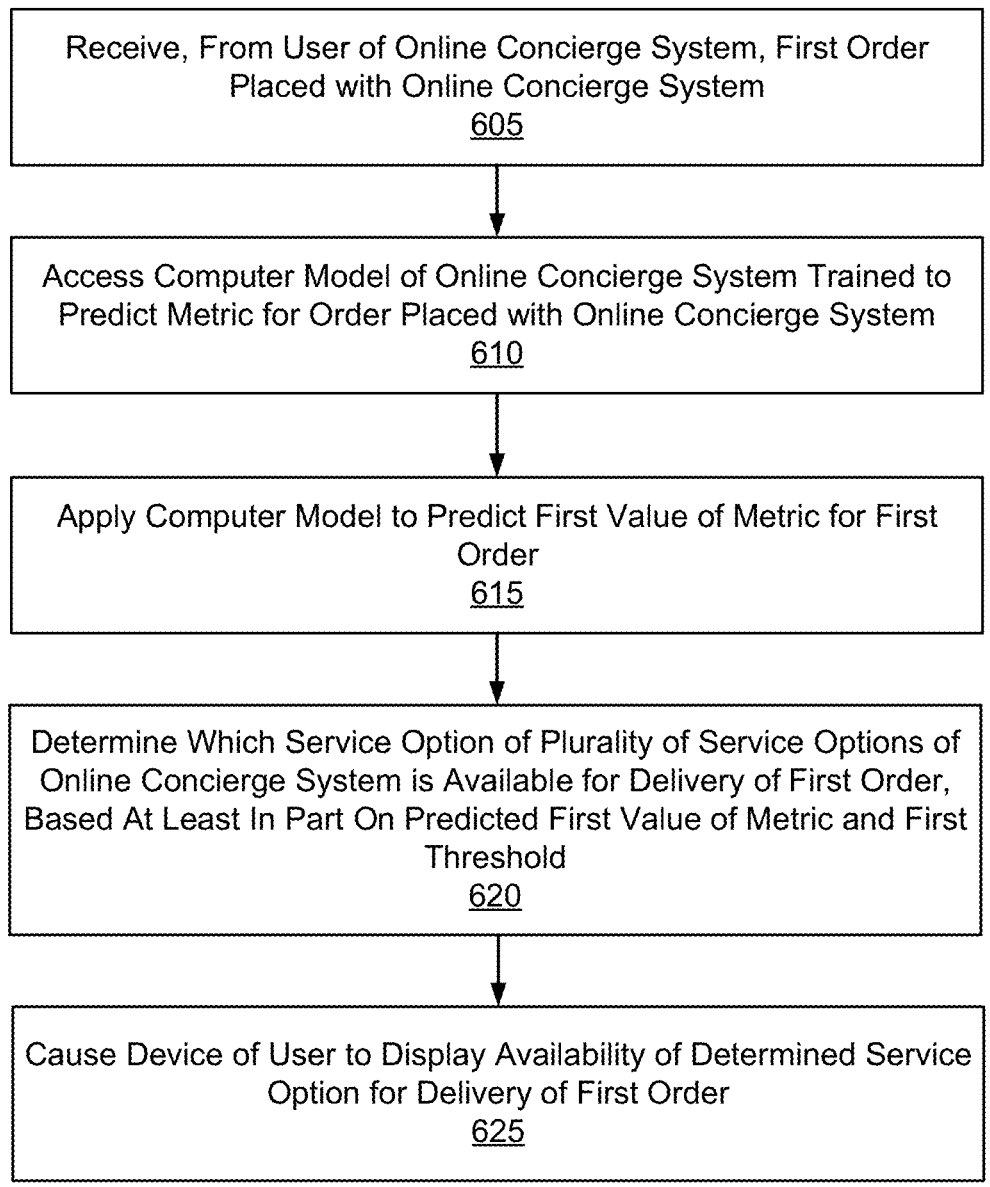
FIG. 6 is a flowchart of a method of determining an availability of a service option for delivery of an order placed with an online concierge system, in accordance with one or more embodiments.

FIG. 6 is a flowchart of a method of determining an availability of a service option for delivery of an order placed with an online concierge system, in accordance with one or more embodiments. Alternative embodiments may include more, fewer, or different steps from those illustrated in FIG. 6, and the steps may be performed in a different order from that illustrated in FIG. 6. These steps may be performed by an online concierge system (e.g., the online concierge system 140). Additionally, each of these steps may be performed automatically by the online concierge system without human intervention.

The online concierge system 140 receives 605 (e.g., via the order request module 222), from a user of the online concierge system 140, a first order placed with the online concierge system 140. The online concierge system 140 accesses 610 a computer model of the online concierge system 140 (e.g., via the metric determination module 225) trained to predict a metric for an order placed with the online concierge system.

The online concierge system 140 applies 615 the computer model (e.g., via the metric determination module 225) to predict a first value of the metric for the first order. The predicted first value of the metric may be based on a predicted amount of time (e.g., TTA) for a picker of a plurality of pickers to accept the first order once the first order is made available to the plurality of pickers. The online concierge system 140 may input (e.g., via the metric determination module 225) one or more features of the first order into the computer model to predict the first value of the metric for the first order. The one or more features may include information about one or more items in a shopping cart associated with the first order.

The online concierge system 140 determines 620 (e.g., via the service option determination module 227) which service option of a plurality of service options of the online concierge system 140 is available for delivery of the first order, based at least in part on the predicted first value of the metric and a first threshold. Once the online concierge system 140 determines which service option is available for delivery of the first order, the online concierge system 140 causes 625 (e.g., via the content presentation module 210) a device of the user (e.g., the customer client device 100) to display an availability of the determined service option for delivery of the first order.

The online concierge system 140 may cause (e.g., via the content presentation module 210) the device of the user to display an availability of a first of the plurality of service options (e.g., scheduled delivery service option) having a first delivery time associated with the first order, when the predicted first value of the metric is greater than a first threshold. The online concierge system 140 may cause (e.g., via the content presentation module 210) the device of the user to display the availability of the first service option, when the predicted first value of the metric is greater than the first threshold increased by a defined parameter. The availability of the first service option for the first order may be determined by, e.g., the service option determination module 227.

The online concierge system 140 may cause (e.g., via the content presentation module 210) the device of the user to display an availability of a second of the plurality of service options (e.g., sETA service option) having a second delivery time associated with the first order that is less than the first delivery time, when the predicted first value of the metric is less than or equal to the first threshold. The online concierge system 140 may cause (e.g., via the content presentation module 210) the device of the user to display the availability of the second service option having the second delivery time, when the predicted first value of the metric is greater than or equal to a larger of a second threshold and the first threshold decreased by a first parameter and the predicted first value of the metric is less than or equal to the first threshold increased by a second parameter, wherein the second threshold is less than the first threshold (e.g., as determined by the threshold determination module 229). The availability of the second service option for the first order may be determined by, e.g., the service option determination module 227.

The online concierge system 140 may receive (e.g., via the order request module 222) a plurality of orders placed with the online concierge system 140. The online concierge system 140 may access the computer model (e.g., via the metric determination module 225) trained to predict the metric for the order placed with the online concierge system 140. The online concierge system 140 may apply the computer model (e.g., via the metric determination module 225) to predict a value of the metric for each of the plurality of orders. The online concierge system 140 may cause (e.g., via the content presentation module 210) a device (e.g., the customer client device 100) of a corresponding user of the online concierge system 140 to display an availability of the second service option having the second delivery time associated with each of the plurality of orders, based on the predicted value of the metric being less than a larger of the second threshold and the first threshold decreased by the first parameter. The availability of the second service option associated with each of the plurality of orders may be determined by, e.g., the service option determination module 227.

The online concierge system 140 may receive (e.g., via the order request module 222), from the user, a second order placed with the online concierge system 140. The online concierge system 140 may access the computer model (e.g., via the metric determination module 225) trained to predict the metric for the order placed with the online concierge system 140. The online concierge system 140 may apply the computer model (e.g., via the metric determination module 225) to predict a second value of the metric for the second order. The predicted second value of the metric may be based on a predicted amount of time (e.g., TTA) for a picker of the plurality of pickers to accept the second order once the second order is made available to the plurality of pickers. The online concierge system 140 may cause (e.g., via the content presentation module 210) the device of the user to display an availability of the first service option of the online concierge system 140 having the first delivery time associated with the second order, when the predicted second value of the metric is greater than the second threshold. The online concierge system 140 may cause (e.g., via the content presentation module 210) the device of the user to display an availability of a third of the plurality of service options (e.g., pETA service option) having a third delivery time associated with the second order that is less than the second delivery time, when the predicted second value of the metric is less than or equal to the second threshold. The availability of a service option for the second order may be determined by, e.g., the service option determination module 227.

The online concierge system 140 may cause (e.g., via the content presentation module 210) the device of the user to display the availability of the first service option (e.g., as determined by the service option determination module 227) having the first delivery time associated with the second order, when the predicted second value of the metric is greater than a smaller of the first threshold and the second threshold increased by the second parameter. The online concierge system 140 may cause (e.g., via the content presentation module 210) the device of the user to display the availability of the third service option (e.g., as determined by the service option determination module 227) having the third delivery time associated with the second order, when the predicted second value of the metric is greater than or equal to the second threshold decreased by the first parameter and the predicted second value of the metric is less than or equal to a smaller of the first threshold and the second threshold increased by the second parameter.

The online concierge system 140 may receive (e.g., via the order request module 222) a plurality of orders placed with the online concierge system 140. The online concierge system 140 may access the computer model (e.g., via the metric determination module 225) trained to predict the metric for the order placed with the online concierge system 140. The online concierge system 140 may apply the computer model (e.g., via the metric determination module 225) to predict a value of the metric for each of the plurality of orders. The online concierge system 140 may cause (e.g., via the content presentation module 210) a device (e.g., of the customer client device 100) of a corresponding user of the online concierge system 140 to display the availability of the third service option (e.g., as determined by the service option determination module 227) having the third delivery time associated with each of the plurality of orders, based on the predicted value of the metric being smaller than the second threshold decreased by a defined parameter.

Embodiments of the present disclosure are directed to determination, on per-order (i.e., per-customer) basis, of an availability of at least one of immediate delivery service options (e.g., sETA and/or pETA service options). A computer model is deployed to predict a metric (e.g., TTA) for an order placed with the online concierge system 140, and the online concierge system 140 uses the predicted metric to determine whether any of the immediate delivery service options is available for a cart order by a customer of the online concierge system 140. The method presented herein opens up a new lever to optimize the service option availability for improvement of customer conversion and fulfillment efficiency. Instead of determining a service option availability at a zone level, the method presented herein enables performing finer grain trade-off at a cart/visit level.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
   receiving, via a network and from a device associated with a user of an online system, order data including information about a list of items in an order placed by the user via a user interface of the device associated with the user, information about a delivery location for the order, and a timeframe during which items from the list should be delivered to the delivery location;
   receiving, via the network, supply data including information about a current level of available supply at the online system for servicing orders;
   responsive to receiving the order data, accessing a machine-learning model of the online system, wherein the machine-learning model includes a multilayer neural network and is trained to predict a time to accept servicing of the order by the online system, training of the machine-learning model comprises:
      generating a set of training examples including data related to a collection of past orders,
      obtaining a label for each training example from the set of training examples,
      applying a set of parameters of the machine-learning model to the set of training examples to generate an output for each training example from the set of training examples, the set of parameters including weights and biases that are applied at each neuron of the multilayer neural network,
      comparing the output for each training example to the label using a loss function to generate a score for each training example, and
      updating, through a back-propagation process, the set of parameters of the machine-learning model using the score for each training example;
   applying the machine-learning model to the order data and the supply data to generate a value of a metric for the order that is indicative of the time to accept servicing of the order;
   comparing the value of the metric to a first threshold value;
   determining, based on a result of comparing the value of the metric to the first threshold value, a service option of a plurality of service options for servicing the order;
   causing the device associated with the user to display the user interface with an availability of the service option for servicing the order;
   generating, over a time period, training order data including information about a plurality of values of the metric indicative of a plurality of times to accept servicing of a set of orders, wherein the plurality of times to accept are generated by the machine-learning model, and the plurality of times to accept include the time to accept;
   collecting, over the time period, information about levels of available supply at the online system for servicing the set of orders; and
   re-training the machine-learning model by updating, through the back-propagation process, the set of parameters of the machine-learning model using the training order data and the information about levels of available supply.

2. The method of claim 1, further comprising:
   causing the device associated with the user to display an availability of a first of the plurality of service options having a first delivery time associated with the order, when the value of the metric is greater than the first threshold value; and causing the device associated with the user to display an availability of a second of the plurality of service options having a second delivery time associated with the order that is less than the first delivery time, when the value of the metric is less than or equal to the first threshold value.

3. The method of claim 2, further comprising:
receiving, via the network and from the device associated with the user, second order data including information about a second list of items in a second order placed by the user via the user interface of the device associated with the user;
receiving, via the network, second supply data including information about a current updated level of available supply at the online system for servicing orders;
responsive to receiving the second order data, applying the machine-learning model to the second order data and the second supply data to generate a second value of the metric for the second order that is indicative of a second time to accept servicing of the second order;
causing the device associated with the user to display an availability of the first service option having the first delivery time associated with the second order, when the second value of the metric is greater than a second threshold value that is less than the first threshold value; and
causing the device associated with the user to display an availability of a third of the plurality of service options having a third delivery time associated with the second order that is less than the second delivery time, when the second value of the metric is less than or equal to the second threshold value.

4. The method of claim 3, further comprising:
causing the device associated with the user to display the availability of the first service option having the first delivery time associated with the second order, when the second value of the metric is greater than a smaller of the first threshold value and the second threshold value increased by a second parameter; and
causing the device associated with the user to display the availability of the third service option having the third delivery time associated with the second order, when the second value of the metric is greater than or equal to the second threshold value decreased by a first parameter and the second value of the metric is less than or equal to a smaller of the first threshold value and the second threshold value increased by the second parameter.

5. The method of claim 3, further comprising:
receiving, via the network, information about a plurality of orders placed with the online system;
applying the machine-learning model to the information about the plurality of orders and the second supply data to generate a value of the metric for each of the plurality of orders that is indicative of a respective time to accept each of the plurality of orders; and
causing a device associated with a corresponding user of the online system to display the availability of the third service option having the third delivery time associated with each of the plurality of orders, based on the value of the metric for each of the plurality of orders being smaller than the second threshold value decreased by a defined parameter.

6. The method of claim 1, further comprising:
causing the device associated with the user to display an availability of a first of the plurality of service options having a first delivery time associated with the order, when the value of the metric is greater than the first threshold value increased by a second parameter; and
causing the device associated with the user to display an availability of a second of the plurality of service options having a second delivery time associated with the order that is less than the first delivery time, when the value of the metric is greater than or equal to a larger of a second threshold value and the first threshold value decreased by a first parameter and the value of the metric is less than or equal to the first threshold value increased by the second parameter, wherein the second threshold value is less than the first threshold value.

7. The method of claim 6, further comprising:
receiving, via the network, information about a plurality of orders placed with the online system;
applying the machine-learning model to the information about the plurality of orders and the supply data to generate a value of the metric for each of the plurality of orders that is indicative of a respective time to accept servicing of each of the plurality of orders; and
causing a device associated with a corresponding user of the online system to display an availability of the second service option having the second delivery time associated with each of the plurality of orders that is less than the first delivery time, based on the value of the metric for each of the plurality of orders being less than a larger of the second threshold value and the first threshold value decreased by the first parameter.

8. The method of claim 1, wherein the value of the metric is based on a predicted amount of time for a picker of a plurality of pickers to accept the order once the order is made available to the plurality of pickers.

9. The method of claim 1, wherein applying the machine-learning model further comprises:
applying the machine-learning model further to one or more additional features of the order that are input into the machine-learning model to generate the value of the metric for the order.

10. A computer program product comprising a non-transitory computer readable storage medium having instructions encoded thereon that, when executed by a processor, cause the processor to perform steps comprising:
receiving, via a network and from a device associated with a user of an online system, order data including information about a list of items in an order placed by the user via a user interface of the device associated with the user, information about a delivery location for the order, and a timeframe during which items from the list should be delivered to the delivery location;
receiving, via the network, supply data including information about a current level of available supply at the online system for servicing orders;
responsive to receiving the order data, accessing a machine-learning model of the online system, wherein the machine-learning model includes a multilayer neural network and is trained to predict a time to accept servicing of the order by the online system, training of the machine-learning model comprises:
generating a set of training examples including data related to a collection of past orders,
obtaining a label for each training example from the set of training examples,
applying a set of parameters of the machine-learning model to the set of training examples to generate an output for each training example from the set of training examples, the set of parameters including weights and biases that are applied at each neuron of the multilayer neural network, comparing the output for each training example to the label using a loss function to generate a score for each training example, and updating, through a back-propagation process, the set of parameters of the machine-learning model using the score for each training example;

applying the machine-learning model to the order data and the supply data to generate a value of a metric for the order that is indicative of the time to accept servicing of the order;

comparing the value of the metric to a first threshold value;

determining, based on a result of comparing the value of the metric to the first threshold value, a service option of a plurality of service options for servicing the order;

causing the device associated with the user to display the user interface with an availability of the service option for servicing the order;

generating, over a time period, training order data including information about a plurality of values of the metric indicative of a plurality of times to accept servicing of a set of orders, wherein the plurality of times to accept are generated by the machine-learning model, and the plurality of times to accept include the time to accept;

collecting, over the time period, information about levels of available supply at the online system for servicing the set of orders; and re-training the machine-learning model by updating, through the back-propagation process, the set of parameters of the machine-learning model using the training order data and the information about levels of available supply.

11. The computer program product of claim 10, wherein the instructions further cause the processor to perform steps comprising:

causing the device associated with the user to display an availability of a first of the plurality of service options having a first delivery time associated with the order, when the value of the metric is greater than the first threshold value; and causing the device associated with the user to display an availability of a second of the plurality of service options having a second delivery time associated with the order that is less than the first delivery time, when the value of the metric is less than or equal to the first threshold value.

12. The computer program product of claim 11, wherein the instructions further cause the processor to perform steps comprising:

receiving, via the network and from the device associated with the user, second order data including information about a second list of items in a second order placed by the user via the user interface of the device associated with the user;

receiving, via the network, second supply data including information about a current updated level of available supply at the online system for servicing orders;

responsive to receiving the second order data, applying the machine-learning model to the second order data and the second supply data to generate a second value of the metric for the second order that is indicative of a second time to accept servicing of the second order;

causing the device associated with the user to display an availability of the first service option having the first delivery time associated with the second order, when the second value of the metric is greater than a second threshold value that is less than the first threshold value; and causing the device associated with the user to display an availability of a third of the plurality of service options having a third delivery time associated with the second order that is less than the second delivery time, when the second value of the metric is less than or equal to the second threshold value.

13. The computer program product of claim 12, wherein the instructions further cause the processor to perform steps comprising:

causing the device associated with the user to display the availability of the first service option having the first delivery time associated with the second order, when the second value of the metric is greater than a smaller of the first threshold value and the second threshold value increased by a second parameter; and causing the device associated with the user to display the availability of the third service option having the third delivery time associated with the second order, when the second value of the metric is greater than or equal to the second threshold value decreased by a first parameter and the second value of the metric is less than or equal to a smaller of the first threshold value and the second threshold value increased by the second parameter.

14. The computer program product of claim 12, wherein the instructions further cause the processor to perform steps comprising:

receiving, via the network, information about a plurality of orders placed with the online system;

applying the machine-learning model to the information about the plurality of orders and the second supply data to generate a value of the metric for each of the plurality of orders that is indicative of a respective time to accept each of the plurality of orders; and causing a device associated with a corresponding user of the online system to display the availability of the third service option having the third delivery time associated with each of the plurality of orders, based on the value of the metric for each of the plurality of orders being smaller than the second threshold value decreased by a defined parameter.

15. The computer program product of claim 10, wherein the instructions further cause the processor to perform steps comprising:

causing the device associated with the user to display an availability of a first of the plurality of service options having a first delivery time associated with the order, when the value of the metric is greater than the first threshold value increased by a second parameter; and causing the device associated with the user to display an availability of a second of the plurality of service options having a second delivery time associated with the order that is less than the first delivery time, when the value of the metric is greater than or equal to a larger of a second threshold value and the first threshold value decreased by a first parameter and the value of the metric is less than or equal to the first threshold value increased by the second parameter, wherein the second threshold value is less than the first threshold value.

16. The computer program product of claim 15, wherein the instructions further cause the processor to perform steps comprising:

receiving, via the network, information about a plurality of orders placed with the online system;

applying the machine-learning model to the information about the plurality of orders and the supply data to generate a value of the metric for each of the plurality of orders that is indicative of a respective time to accept servicing of each of the plurality of orders; and causing a device associated with a corresponding user of the online system to display an availability of the second service option having the second delivery time associated with each of the plurality of orders that is less than the first delivery time, based on the value of the metric for each of the plurality of orders being less than a larger of the second threshold value and the first threshold value decreased by the first parameter.

17. The computer program product of claim 10, wherein the value of the metric is based on a predicted amount of time for a picker of a plurality of pickers to accept the order once the order is made available to the plurality of pickers.

18. The computer program product of claim 10, wherein the instructions further cause the processor to perform steps comprising:

applying the machine-learning model further to one or more additional features of the order that are input into the machine-learning model to generate the value of the metric for the order.

19. A computer system comprising:

a processor; and a non-transitory computer-readable storage medium having instructions that, when executed by the processor, cause the computer system to perform steps comprising:

receiving, via a network and from a device associated with a user of an online system, order data including information about a list of items in an order placed by the user via a user interface of the device associated with the user, information about a delivery location for the order, and a timeframe during which items from the list should be delivered to the delivery location;

receiving, via the network, supply data including information about a current level of available supply at the online system for servicing orders;

responsive to receiving the order data, accessing a machine-learning model of the online system, wherein the machine-learning model includes a multilayer neural network and is trained to predict a time to accept servicing of the order by the online system, training of the machine-learning model comprises:

generating a set of training examples including data related to a collection of past orders, obtaining a label for each training example from the set of training examples, applying a set of parameters of the machine-learning model to the set of training examples to generate an output for each training example from the set of training examples, the set of parameters including weights and biases that are applied at each neuron of the multilayer neural network, comparing the output for each training example to the label using a loss function to generate a score for each training example, and updating, through a back-propagation process, the set of parameters of the machine-learning model using the score for each training example;

applying the machine-learning model to the order data and the supply data to generate a value of a metric for the order that is indicative of the time to accept servicing of the order;

comparing the value of the metric to a first threshold value;

determining, based on a result of comparing the value of the metric to the first threshold value, a service option of a plurality of service options for servicing the order;

causing the device associated with the user to display the user interface with an availability of the service option for servicing the order;

generating, over a time period, training order data including information about a plurality of values of the metric indicative of a plurality of times to accept servicing of a set of orders, wherein the plurality of times to accept are generated by the machine-learning model, and the plurality of times to accept include the time to accept;

collecting, over the time period, information about levels of available supply at the online system for servicing the set of orders; and re-training the machine-learning model by updating, through the back-propagation process, the set of parameters of the machine-learning model using the training order data and the information about levels of available supply.

* * * * *